United States Patent [19]
Sasuta

[11] Patent Number: 5,483,672
[45] Date of Patent: Jan. 9, 1996

[54] METHOD FOR A COMMUNICATION UNIT THAT CONSERVE SOURCE ENERGY

[75] Inventor: Michael D. Sasuta, Mundelein, Ill.

[73] Assignee: Motorola, Inc., Schaumburg, Ill.

[21] Appl. No.: 828,065

[22] Filed: Jan. 30, 1992

[51] Int. Cl.⁶ .................................................. H04B 7/26
[52] U.S. Cl. ........................ 455/54.1; 455/56.1; 455/343
[58] Field of Search ................................ 455/38.2, 38.3,
455/53.1, 33.1, 54.1, 33.2, 54.2, 56.1, 67.1,
34.1, 127, 313, 15, 17; 379/59, 60, 63;
340/825.44; 370/95.1, 95.2, 95.3, 58.1,
60.1, 68.1, 85.6

[56] References Cited

U.S. PATENT DOCUMENTS

| | | | |
|---|---|---|---|
| 4,398,192 | 8/1983 | Moore et al. | 340/825.44 |
| 5,060,296 | 10/1991 | Grube et al. | 455/34.1 |
| 5,095,529 | 3/1992 | Comroe et al. | 379/60 |
| 5,109,527 | 4/1992 | Akenberg | 370/95.3 |
| 5,159,593 | 10/1992 | D'Amico et al. | 370/85.6 |
| 5,175,870 | 12/1992 | Mabey et al. | 370/95.3 |
| 5,241,542 | 8/1993 | Natarajan et al. | 455/343 |

Primary Examiner—Reinhard J. Eisenzopf
Assistant Examiner—Nguyen Vo
Attorney, Agent, or Firm—Timothy W. Markison; Daniel C. Crilly

[57] ABSTRACT

In a communication system, a communication unit may conserve source energy when it is inactive in the following manner. The control channel is partitioned into a predetermined number of windows and a system window which are transmitted on the control channel in a round robin manner. When the communication unit registers with the communication system, it is assigned to a window group. The communication unit then monitors only the system window to determine whether the window group that its been assigned to is also assigned to one of the predetermined number of windows. When the window that has been assigned to the window group is being transmitted on the control channel, the communication unit activates to monitor that window. Once the window is no longer being transmitted, the communication unit deactivates until the system window is being transmitted or the window assigned to the window group is being transmitted.

12 Claims, 2 Drawing Sheets

METHOD FOR A COMMUNICATION UNIT THAT CONSERVE SOURCE ENERGY

FIELD OF THE INVENTION

This invention relates generally to communication systems and in particular to a method that allows a communication unit to conserve source energy when it is not actively engaged in a communication.

BACKGROUND OF THE INVENTION

Trunked communication systems are known to comprise a plurality of communication units, a limited number of communication resources that are transceived via a predetermined number of repeaters, or base stations, and a communication resource allocator that allocates a limited number of communication resources among the plurality of communication units. The communication resources may comprise a TDM bus, a carrier frequency, a pair of carrier frequencies, or any RF transmission means. Of the communication resources, one is selected as the control channel which transceives operational data between the communication resource allocator and the communication units. The communication units, which may be portable radios and/or mobile radios, are arranged into talk groups by commonality of use. For example, a talk group may comprise communication units that are operated by a police department while another talk group comprises communication units operated by a fire department.

In a trunked communication system, a communication unit is often inactive, i.e. not engaged in a communication or transmission of data, and is monitoring the control channel. The control channel continually transmits outbound signalling words (OSW) which each of the communication units receive. Each of the communication units processes the OSWs to determine whether it was addressed to them. The processing of OSWs comprises receiving the OSW, reading the OSW to determine the addressee, and, if it is addressed to that communication unit, perform the operation contained in the OSW. This processing function requires the communication unit to be fully operational at all times which, for battery operated units, reduces the useful life of the unit between battery recharges. Thus, a need exists for a method that conserves source energy while the communication unit is inactive.

SUMMARY OF THE INVENTION

This need and others are substantially met by the method for a communication unit to conserve source energy as disclosed herein. In a communication system that includes a plurality of communication units, a limited number of communication resources that are transceived via a plurality of repeaters, a communication resource allocator that allocates the limited number of communication resources among the plurality of communication units, and wherein at least one of the limited number of communication resources serves as a control channel which continually transmits system information, a method that will allow a communication unit to conserve source energy when monitoring the control channel is as follows. The method comprises partitioning the control channel into a predetermined number of windows and a system window, wherein the system window and the predetermined number of windows are transmitted in a round robin manner on the control channel. Once the control channel is partitioned, the communication resource allocator assign communication unit to at least one window group when the communication unit registers with the communication system. The communication unit will then monitor the system window to determine whether the at least one assigned window group has been assigned to one of the predetermined number of windows when the communication unit is not transmitting or identified as an active communication unit. When the assigned window is being transmitted on the control channel, the communication unit activates to process any information contained in the assigned window and deactivates when the assigned window is not being transmitted.

DESCRIPTION OF A PREFERRED EMBODIMENT

Figure 1:
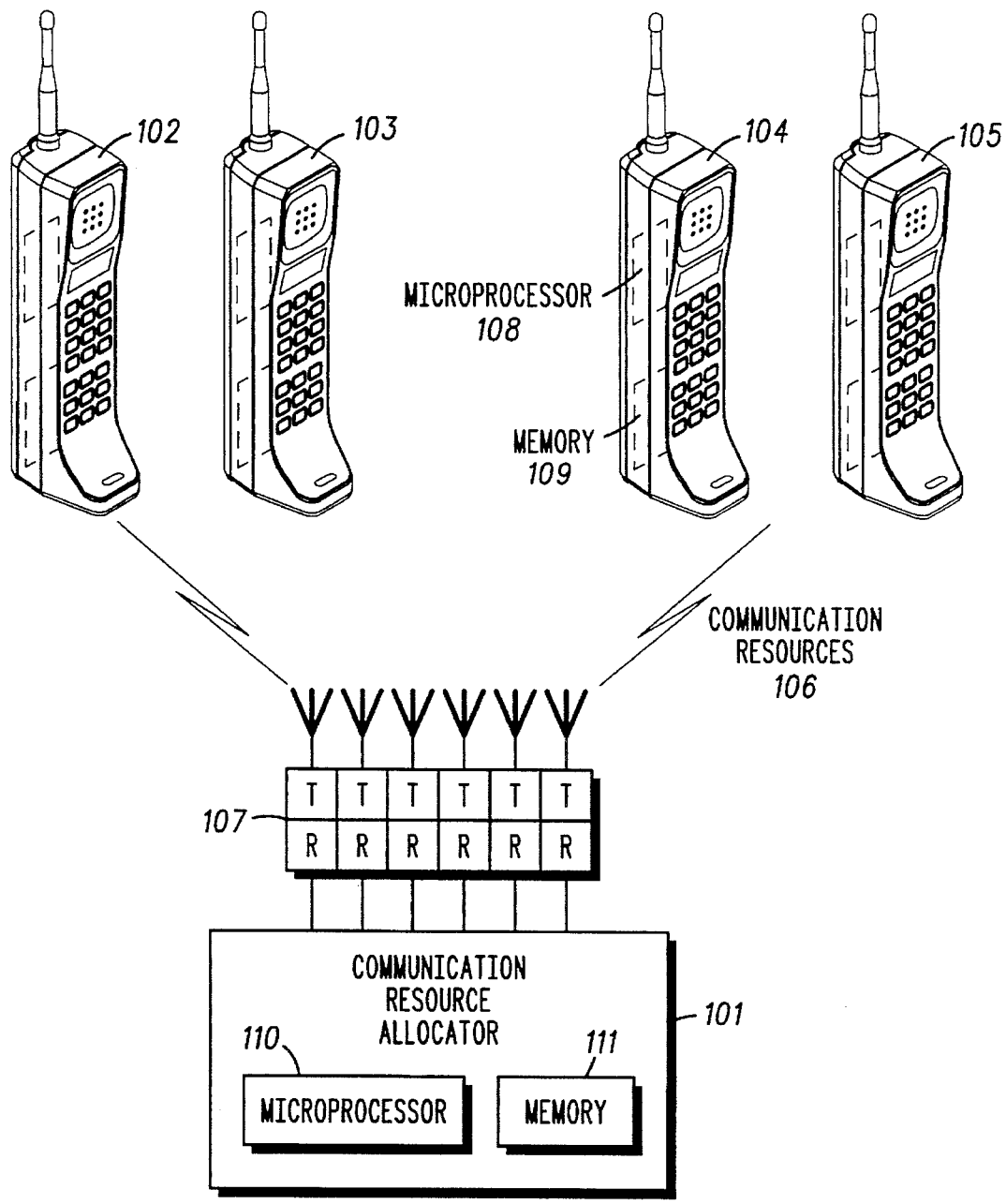
FIG. 1 illustrates a trunked communication system that may incorporate the present invention.

FIG. 1 illustrates a trunking communication system comprising a communication resource allocator 101, a plurality of communication units (four shown) 102–105, a limited number of communication resources 106, and a limited number of repeaters 107. Each of the communication units 102–105, comprise at least one microprocessor 108 and a digital storage memory device 109 which may be RAM, ROM or any other type of means for storing digital information. The communication resource allocator 101 comprises at least one microprocessor 110 and digital memory 111, wherein the digital memory may be RAM, ROM, or any other type of means for storing digital information. Each of the communication resources 106 are transceived between the communication units 102–105 and the communication resource allocator 101 via the repeaters 107, wherein the repeaters may comprise base stations. One of the communication resources 106 is selected as the control channel which transceives trunking communication system control data between the communication resource allocator and the communication units 102–105.

Figure 2:
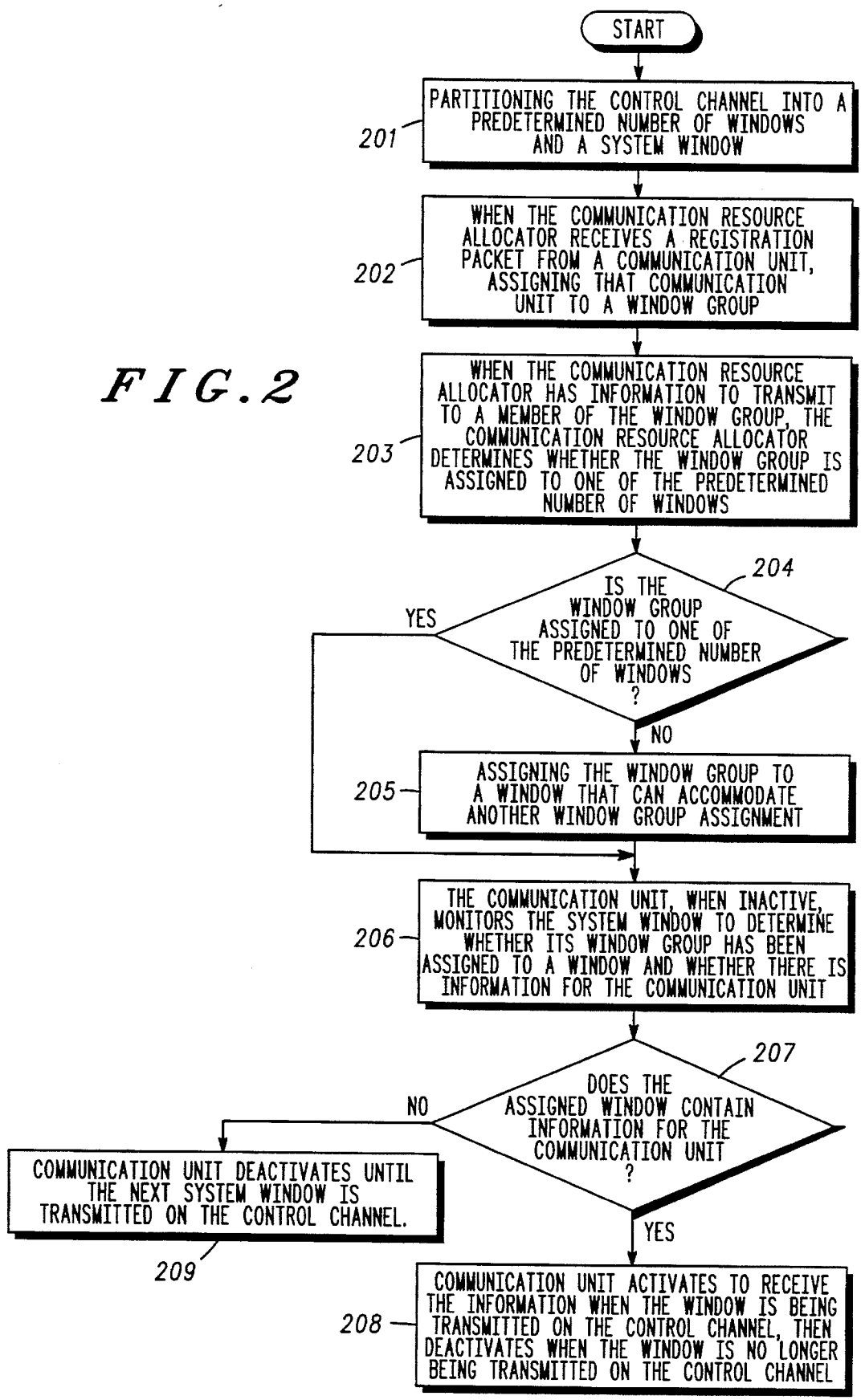
FIG. 2 illustrates a logic diagram of an implementation of the present invention.

Within a trunking communication system, a communication unit spends a substantial amount of time being inactive. An inactive communication unit is one that is not involved in a voice or data communication and is only monitoring the control channel for information that may pertain to it. Such information may be specific data for the communication unit which requires a response, such as transmit status, or it may be a message for the communication unit's talk group, such as a communication resource has been allocated to the talk group. Even though a communication unit may be inactive in a prior an system, its processing circuitry, which is known in the art, (not shown) is fully active so that it can decipher whether the information on the control channel is for it or not. FIG. 2 illustrates a method that allows a communication unit to conserve source energy when it is inactive by activating its processing circuitry only when the control channel is transmitting information pertaining to the communication unit.

Referring to FIG. 2 at step 201, the control channel is partitioned into a predetermined number of windows and a system window which are transmitted in a round robin sequence. Each of the predetermined number of windows supports a predetermined number of messages, for example, two messages per window. The system window contains general system information and information relating to window assignments. The assignment of windows will be discussed below.

With the control channel partitioned, the communication resource allocator, when it receives a registration packet from a communication unit, assigns the communication unit to a window group 202. A window group is a fictitious group established solely for the purpose of assigning large numbers of communication units to at least one of the predetermined number of windows. The communication resource allocator will determine which window group to assign a registering communication unit based upon the characteristics of the communication unit. For example, communication units in the same talk group will be assigned to the same window group as well as communication units in similar function talk groups. Thus, communication units operated by the police department and fire department may be assigned to the same window group, while private trucking companies would be assigned to a different window group. In addition, the number of window groups will be substantially less than the number of talk groups and may equal the number of predetermined number of windows.

When the communication resource allocator has information to transmit to a member of a window group, the communication resource allocator determines whether that particular window group has been assigned to one of the predetermined number of windows. If the window group is not assigned to one of the predetermined number of windows 204, it is assigned to a window that can accommodate another window group assignment 205. If each of the window group assignments is full, i.e. the predetermined number of messages within a window are assigned to a window group, the assignment of the window group will not take place until an opening in one of the window groups occurs. An opening occurs when there is no information to be transmitted to a member of a window group that is assigned to a window and the communication resource allocator deletes the assignment. The assignment of window groups to windows is updated each time the cycle repeats.

Once a window group is assigned to a window, an inactive communication unit monitors the system window to determine whether its window group has been assigned to a window and whether there is information for that communication unit 206. If the assigned window does not contain information for the particular communication unit 207, the communication unit deactivates its processing circuitry, not shown, until the next system window is transmitted on the control channel 209. The communication unit may deactivate its processing circuitry, which includes a control process that controls all functional operations of the communication unit and an RF unit that allows the communication unit to transceive information with the communication resource allocator, by opening a source line, via a switch, from the power source, or by sending a low power signal to the processing circuitry. If the assigned window does contain information for the communication unit 207, the communication unit activates to receive the information when the assigned window is being transmitted on the control channel 208. After receiving the information from the assigned window, the communication unit will deactivate unless the information contained in the window requires the communication unit to become active 208.

A communication unit determines when the system window is being transmitted and when its assigned window is being transmitted by counting the messages transmitted on the control channel. Each communication unit is programmed with the number of windows and the time each window takes to be transmitted. By having each communication unit capable of determining when information is going to be sent to it, its processing circuitry can remain inactive until the unit is receiving information.

With the above method, a communication unit can conserve source energy when it is inactive. When a communication unit is inactive, in accordance with the present invention, it will only activate to monitor the system window and its assigned window if one exists. Thus, the communication unit is only on for a fraction of the time when monitoring the control channel. For example, when there are four windows and one system window, the communication unit will be on one-fifth of the time to receive the system window information and up to two or three-fifths of the time depending on how many windows it is assigned to. For example, the communication resource allocator might assign the communication unit to a second window when the information to be transmitted to the communication unit cannot be fully transmitted within the originally assigned window. In this case, the communication unit would be active three-fifths of the time. Thus, regardless of the number of windows, the processing circuitry of the communication unit remains inactive for a substantial period of the time.

I claim:

1. In a communication system that includes a plurality of communication units, a limited number of communication resources that are transceived via a plurality of repeaters, and a communication resource allocator that allocates the limited number of communication resources among the plurality of communication units, wherein at least one of the limited number of communication resources serves as a control channel which continually transmits system information, a method for the communication system to allow a communication unit of the plurality of communication units to conserve source energy when monitoring the control channel, the method comprises the steps of:

a) partitioning the control channel into a predetermined number of windows and a system window, wherein the system window and the predetermined number of windows are transmitted in a round robin manner on the control channel;

b) assigning, by the communication resource allocator, the communication unit to a first window group when the communication unit registers with the communication system;

c) monitoring, by the communication unit, the system window to determine whether the first window group has been assigned to a first window of the predetermined number of windows when the communication unit is not transmitting or identified as an active communication unit;

d) activating the communication unit to process at least part of the system information contained in the first window when the first window is being transmitted on the control channel; and e) deactivating the communication unit when the first window is not being transmitted on the control channel and when the at least part of the system information does not require the communication unit to remain active.

2. The method of claim 1, wherein step (c) further comprises the step of, when the first window group is assigned to one of the predetermined number of windows, monitoring the system window to determine whether the window assigned to the first window group contains the at least part of the system information for the communication unit.

3. The method of claim 2, Wherein step (d) further comprises the step of determining that the window assigned to the first window group contains the at least part of the system information for the communication unit prior to activating the communication unit.

4. The method of claim 1, further comprising the step of updating assignments of window groups to one of the predetermined number of windows when second information needs to be transmitted to a second communication unit of the plurality of communication units, wherein the second communication unit is assigned to a window group that is not presently assigned to one of the predetermined number of windows.

5. The method of claim 1, wherein the partitioning of the control channel of step (a) further comprises the step of transmitting a predetermined number of messages per window of the predetermined number of windows.

6. The method of claim 5, wherein step (a) further comprises the step of transmitting the at least part of the system information to the communication unit during the first window and a second window when at least part of the system information cannot be fully transmitted within the first window.

7. The method of claim 1, wherein step (a) further comprises the step of transmitting system configuration data within the system window.

8. In a communication system that includes a plurality of communication units, a limited number of communication resources that are transceived via a plurality of repeaters, a communication resource allocator that allocates the limited number of communication resources among the plurality of communication units, and wherein at least one of the limited number of communication resources serves as a control channel which continually transmits system information, a method that allows a communication unit to conserve source energy when monitoring the control channel, the method comprises the steps of:

a) transmitting a registration packet to the communication resource allocator;

b) receiving, in response to the registration packet, an assignment to a window group;

c) monitoring the control channel only when a system window is being transmitted or when a window assigned to the window group is being transmitted; and d) deactivating when a window is being transmitted on the control channel that is not assigned to the window group.

9. The method of claim 8, further comprising the step of determining when the system window or the window assigned to the window group is being transmitted on the control channel by counting messages transmitted on the control channel, wherein a predetermined number of messages are transmitted during each window of a window pattern and the a window pattern is repeated in a round robin manner.

10. In a communication system that includes a plurality of communication units, a limited number of communication resources that are transceived via a plurality of repeaters, and a communication resource allocator that allocates the limited number of communication resources among the plurality of communication units, wherein at least one of the limited number of communication resources serves as a control channel which continually transmits system information, a method for the communication resource allocator to allow a communication unit of the plurality of communication units to conserve source energy when monitoring the control channel, the method comprises the steps of;

a) receiving a registration packet from the communication unit, wherein the registration packet includes a registration request to register to the communication system;

b) assigning the communication unit to at least one window group when the registration request is granted;

c) assigning the at least one window group to one of a predetermined number of windows when information is to be transmitted to the communication unit, wherein the predetermined number of windows along with a system window are transmitted in a round robin sequence on the control channel; and d) transmitting system configuration data to the communication unit via the control channel during the system window.

11. The method of claim 10, further comprising the step of updating assignments of window groups to one of the predetermined number of windows when alternate information needs to be transmitted to an alternate communication unit of the plurality of communication units assigned to at least one alternate window group that is not presently assigned to one of the predetermined number of windows.

12. The method of claim 10, further comprising the step of transmitting the information to the communication unit via the control channel during the window assigned to the at least one window group.

\* \* \* \* \*

UNITED STATES PATENT AND TRADEMARK OFFICE
CERTIFICATE OF CORRECTION

PATENT NO. : 5,483,672
DATED : January 9, 1996
INVENTOR(S) : Michael D. Sasuta

It is certified that error appears in the above-indentified patent and that said Letters Patent is hereby corrected as shown below:

In the title please delete the word "THAT" and insert thereat --TO--.

Col. 6, line 7, please delete the word "a".

Signed and Sealed this

Fourteenth Day of May, 1996

Attest:

BRUCE LEHMAN

*Attesting Officer*  *Commissioner of Patents and Trademarks*